United States Patent [19]
Johnson

[11] Patent Number: 5,695,283
[45] Date of Patent: Dec. 9, 1997

[54] COMPENSATING INFRARED THERMOPILE DETECTOR

[75] Inventor: Bruce C. Johnson, Torrance, Calif.

[73] Assignee: Wahl Instruments, Inc., Culver City, Calif.

[21] Appl. No.: 270,048

[22] Filed: Jul. 1, 1994

[51] Int. Cl.[6] .................................................. G01J 5/16
[52] U.S. Cl. .......................... 374/133; 136/208; 136/213; 136/225
[58] Field of Search ..................... 374/133; 136/205, 136/208, 213, 214, 215, 216, 225

[56] References Cited

U.S. PATENT DOCUMENTS

| | | | |
|---|---|---|---|
| 3,285,069 | 11/1966 | Weiss | 374/133 |
| 3,596,514 | 8/1971 | Mefferd et al. | 136/213 |
| 4,111,717 | 9/1978 | Baxter | 136/213 |
| 4,451,690 | 5/1984 | Ishida | 136/225 |
| 4,456,919 | 6/1984 | Tomita et al. | 136/225 |
| 4,722,612 | 2/1988 | Junkert et al. | 374/133 |
| 4,964,735 | 10/1990 | Sasnett et al. | 374/179 |
| 5,056,929 | 10/1991 | Watanabe et al. | 136/213 |
| 5,159,936 | 11/1992 | Yelderman et al. | 374/126 |

FOREIGN PATENT DOCUMENTS

| | | | |
|---|---|---|---|
| 0765877 | 9/1971 | Belgium | 136/225 |
| 2620573 | 3/1989 | France | 136/225 |
| 1205598 | 11/1965 | Germany | 136/225 |
| 3005112 | 8/1981 | Germany | 136/205 |

*Primary Examiner*—Diego F.F. Gutierrez
*Attorney, Agent, or Firm*—Freilich, Hornbaker & Rosen

[57] ABSTRACT

A thermopile detector for a temperature measuring instrument physically and electrically configured to supply an output signal which indicates a target temperature substantially independent of the influence of ambient temperature changes. The detector is comprised of a plurality of interleaved and electrically opposing thermocouples on a common surface of a substrate wherein the interleaved thermocouples are comprised of active thermocouples having a high emissivity coating to increase their sensitivity to infrared radiation and blind compensating thermocouples having a low emissivity coating to minimize their sensitivity to infrared radiation.

14 Claims, 3 Drawing Sheets

COMPENSATING INFRARED THERMOPILE DETECTOR

BACKGROUND OF THE INVENTION

The present invention relates generally to noncontact temperature measuring and more particularly to improvements in infrared thermometers for minimizing errors associated with ambient temperature transients.

U.S. Pat. No. 4,722,612 issued to K. G. Junkert and H. P. Vosnick discloses a thermopile detector means for a temperature measuring instrument physically and electrically configured to supply an output signal which indicates target temperature substantially independent of the influence of ambient temperature changes. The detector means includes a first thermopile device, exposed to radiation from the target and a transducer means, preferably a second thermopile device, shielded from the target and connected in series opposition to the first.

SUMMARY OF THE INVENTION

The present invention is directed toward improvements in temperature measuring instruments for minimizing errors primarily associated with rapid ambient temperature changes.

In accordance with one aspect of the invention, an improved detector means is provided which is physically and electrically configured to supply an output signal which indicates a target temperature substantially independent of the influence of ambient temperature changes.

The present invention is based on the recognition that a thermocouple supplies an output voltage typically comprised of a first component related to the amount of radiation incident on a sensing area and a second component related to ambient temperature transients. Based upon this recognition, prior art instruments have utilized a separate second transducer, typically comprised of thermocouples, in series opposition which supplies an output voltage similarly related to the ambient temperature transients. In the present invention, a thermopile is comprised of a plurality of opposing thermocouples constructed on a common surface where opposing thermocouples are comprised of active thermocouples, that sense radiation from the target, interleaved with blind thermocouples that do not sense the target radiation. By constructing the thermocouples on the same surface and in close proximity, the errors associated with large and rapid ambient temperature changes are reduced.

In accordance with a preferred embodiment, the detector means is comprised of a plurality of active and blind compensating thermocouples of opposite electrical polarities interconnected and mounted on a common surface to minimize ambient thermal gradients between the active and blind thermocouples.

In accordance with another aspect of the preferred embodiment, a first fabrication step initially forms first and second junctions at the intersections of identical pairs of dissimilar conductive materials. Then, by coating the first junctions with a high emissivity material to absorb incident infrared radiation, active thermocouples are formed and by coating the second junctions with a low emissivity material to minimize absorption of incident radiation, blind thermocouples are formed.

In accordance with a further aspect of the preferred embodiment, all of the active and blind thermocouples are located within a surface areas of less than 1.0 mm in diameter to minimize any ambient thermal gradients.

In accordance with still a further aspect of the preferred embodiment, lead-in conductors for the thermopile are physically configured to minimize the intrusion of thermal transients to the thermopile. More specifically, in accordance with the preferred embodiment, the thermopile lead-in conductors are formed by relatively thin narrow paths of conductive material laid down in serpentine fashion so as to accommodate the maximum length in the available space and thus introduce a large thermal resistance. Additionally, the lead terminations to the substrate utilize like materials to the thermocouples that form the thermopile to eliminate unwanted Seebeck thermocouple effects.

The novel features that are considered characteristic of this invention are set forth in the appended claims. The invention will best be understood from the following description when read in connection with the accompanying drawings.

DESCRIPTION OF THE PREFERRED EMBODIMENTS

Figure 1:
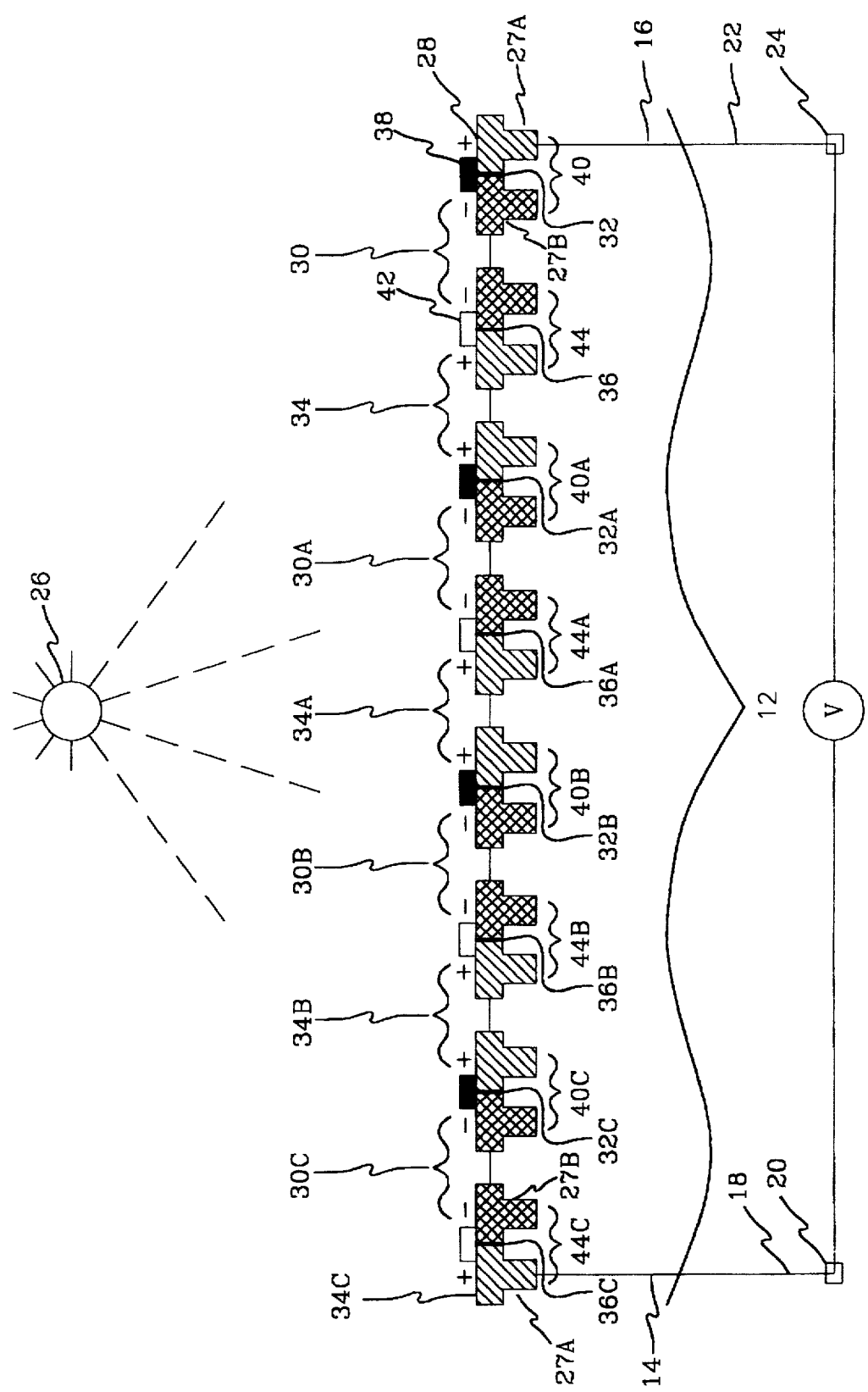
FIG. 1 is a symbolic representation of a thermopile detector of a preferred embodiment showing the repetitive pattern of interleaved active and blind compensating thermocouples.

With reference to FIG. 1, a symbolic representation of a preferred embodiment of a thermopile detector 10 is shown. As shown, a plurality of thermocouples are interconnected in series to form a thermopile 12 having an electrical first end 14 and an electrical second end 16. The electrical first end 14 is coupled via a first serpentine lead path 18 to a first conductive post 20. Similarly, the electrical second end 16 is coupled via a second serpentine lead path 22 to a second conductive post 24. The voltage generated by the thermopile 12 in response to radiation from a target 26 is measured across conductive posts 20 and 24.

As is well known in the art, a thermocouple is comprised of two dissimilar conductors that produce a voltage as a function of the temperature at their junction, i.e., their intersection. Embodiments of the present invention use dissimilar conductive materials 27A, and 27B to form, a first conductive leg 28 and a second conductive leg 30 located on the common surface of a substrate. As shown, a first junction 32 is formed where the two conductive legs 28 and 30 meet. Similarly, a third conductive leg 34 is composed of the same material as found in the first conductive leg 28. The third conductive leg 34 intersects the second conductive leg 30 forming a second junction 36. Due to the order of the conductive legs, the polarity of the voltage generated at the first junction 32 is the opposite of the voltage generated at the second junction 36. Since the junctions 32 and 36 are formed from the same materials 27A, 27B mounted on a common substrate, both junctions will generate essentially identical voltages in response to ambient temperature transients. As a consequence of being oppositely oriented, the net voltage generated across junctions 32 and 36 attributable to ambient temperature transients will be essentially zero.

The primary function of each thermocouple is to sense the temperature of the target 26 by responding to the temperature at each junction. To sense the temperature of the target 26, the first 32 and second 36 junctions are preferably fabricated to increase and decrease their respective sensitivities to infrared radiation from the target 26. The first junction 32 is preferably coated with a high emissivity material 38, such as carbon black, to form an active thermocouple 40 by increasing its absorption of infrared radiation. Conversely, the second junction 36 is preferably coated or plated with a low emissivity material 42, such as gold, silver or aluminum, to form a blind compensating thermocouple 44 by decreasing its absorption of infrared radiation. Thus, infrared radiation from the target 26 essentially will only effect the voltage generated by the active thermocouple 40 and not the blind compensating thermocouple 44. However, the affects of ambient temperature transients are minimized since both the active and blind thermocouples respond in an opposite and essentially equivalent manner to ambient temperature transients. Alternatively as discussed below, optical filter material can be fabricated to alternately pass and block infrared radiation from the junctions to form the active and blind thermocouples.

Figure 2:
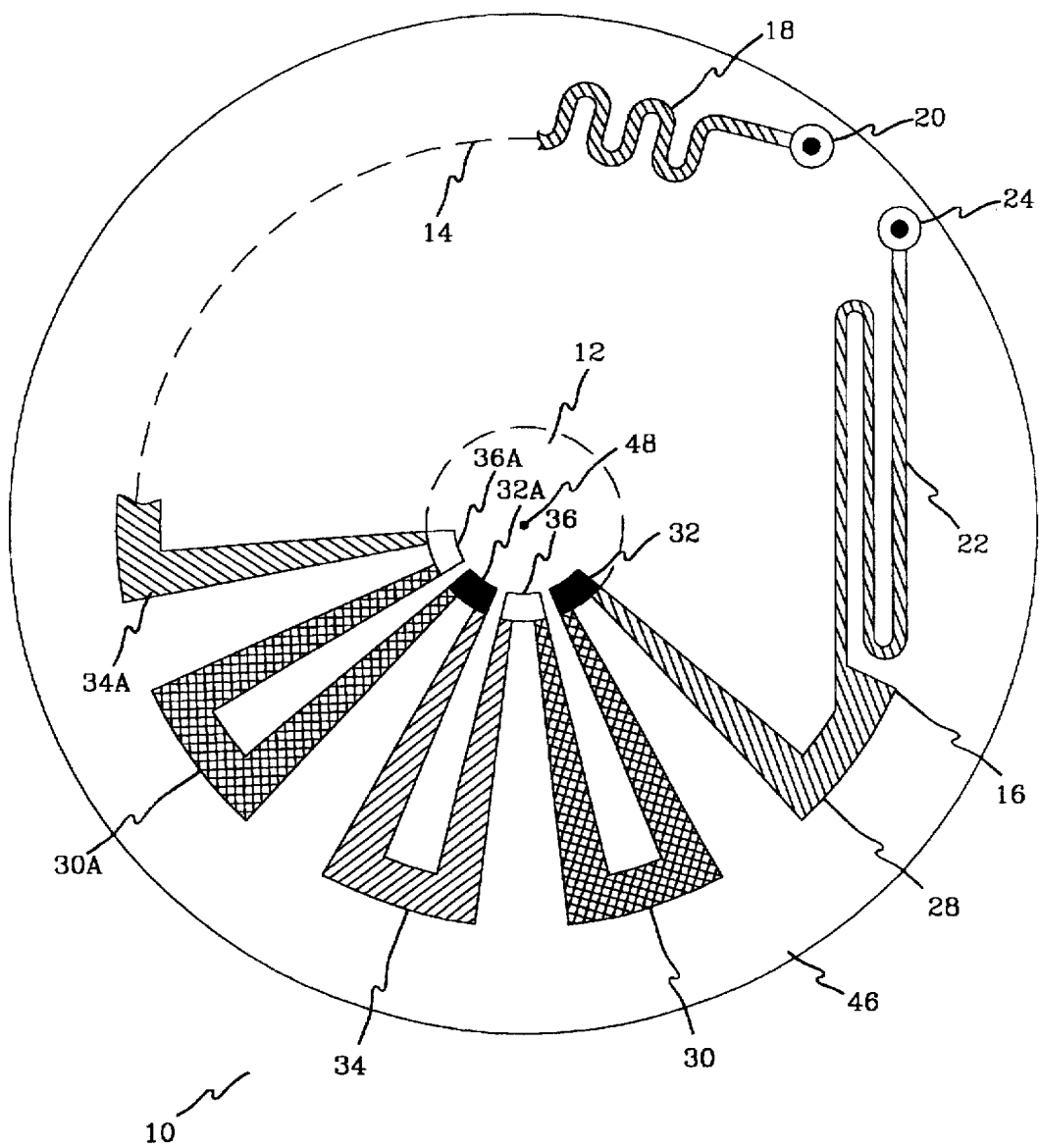
FIG. 2 is a partial, detailed surface view of a thermopile detector of a preferred embodiment having interleaved active and blind compensating thermocouples.

In FIG. 1, eight thermocouples are shown comprised of active junctions 32, 32A, 32B and 32C and blind compensating junctions 36, 36A, 36B and 36C. In a preferred embodiment, the number of blind and active junctions will be the same to cancel the effects of the ambient temperature. However, the actual number of thermocouples depends upon the spacing of the thermocouples that form the thermopile 12. As shown, junctions 32 and 36 are electrically interconnected through the common conductive leg 30, preferably U-shaped as shown in FIG. 2. Similarly junctions 36 and 32A are electrically interconnected through the common conductive leg 34. This interleaved pattern of thermocouples preferably repeats throughout the stack of thermocouples, i.e., the thermopile 12. Due to the symmetry of this pattern, the first end 14 of the thermopile 12 and the second end 16 of the thermopile 12 are comprised of the same conductive material, i.e., the material forming conductive paths 28, 34 and 34A–C.

With reference now to FIG. 2, there is shown a partial view of a preferred embodiment of a thermopile detector 10 of the present invention comprising the thermopile 12 formed on a common surface of a thermally-conductive substrate 46. As previously described, a plurality of first and second electrically-opposing thermocouples, i.e., the thermopile 12, are mounted on the common substrate 46 to reduce ambient temperature transients between the first and second thermocouples. Additionally as previously discussed, the first thermocouples' sensitivity to target radiation is increased by coating with a high emissivity material 38 and the second thermocouples' sensitivity to target radiation is decreased by coating with a low emissivity material 38. The thermopile 12 is coupled to measurement electronics (shown in FIG. 4) through the first conductive post 20 and the second conductive post 24 that senses a temperature indicating signal from the thermopile 12 and generates a signal for driving a temperature display.

Embodiments of the present invention preferably incorporate a plurality of thermocouples (partially shown in FIG. 2) oriented in an essentially circular pattern around a center point 48. However, as opposed to the prior art, embodiments of the present invention are fabricated of interleaved thermocouples of opposing electrical polarities as will now be further discussed.

In a preferred embodiment, this pattern of alternating active and blind compensating thermocouples preferably repeats itself in an essentially circular pattern around the center point 48. It should be apparent to one of ordinary skill in the art that this repeated pattern will preferably consist of an equivalent number of active thermocouples and blind compensating thermocouples and that increasing the number of thermocouple pairs, e.g., active and blind compensating, will increase the sensitivity of the thermopile 12 to infrared radiation without significantly increasing any sensitivity to ambient temperature transients. To further these goals, all thermocouple junctions are located in a small area, preferably within a radius of less than 0.5 mm from the center point 48 in a preferred embodiment. This small area accomplishes two functions. First, all of the active thermocouples receive essentially the same infrared radiation from the target 26 and second, the close proximity of all of the junctions and their placement on the same surface of a common substrate 46 helps insure minimal thermal gradients between the active and the blind compensating thermocouples.

The first end 14 (shown in FIG. 1) and the second end 16 of the thermopile 12 are connected to driving circuitry (shown in FIG. 4) of a measuring instrument to monitor the target radiation. In a preferred embodiment this connection is done through the first 20 and second 24 conductive interconnection posts. It is preferable that any connection between the conductive interconnection posts 20 and 24 and the thermopile 12 not be a thermally conductive path so as to not permit heat from outside of the thermopile detector 10 to be conducted to the thermopile. Thus, lead-in conductors to the thermopile 12 are preferably formed by relatively thin narrow paths of conductive material laid down in serpentine fashion so as to accommodate the maximum length in the available space and thus introduce a large thermal resistance. Additionally, it is preferable to choose the type of conductive material to be used to form this path to eliminate unwanted Seebeck thermocouple effects. If the type of conductive material does not match the outermost conductive material forming the thermopile, these unwanted Seebeck thermocouple effects between connection leads and thermocouples will result at the first end 14 and the second end 16 of the thermopile 12. Thus, the conductive lead path is preferably formed of the same conductive material as the outermost thermopile legs. The second serpentine lead path 22 is preferably formed of the same conductive material as found in the first conductive leg 28 so that a junction is not formed at the second end 16 of the thermopile 12. An additional pair of junctions 32A and 36A, essentially identical to junctions 32 and 36, are shown coupled in series with junctions 32 and 36. Conductive leg 34A is comprised of the same conductive material as found in conductive legs 34 and 28. Thus, the first serpentine lead path is preferably comprised of the same material as the second serpentine lead path 22. Conductive posts 20 and 24 must also be kept in very close proximity to each other to reduce the temperature differential and resultant errors.

Figure 3:
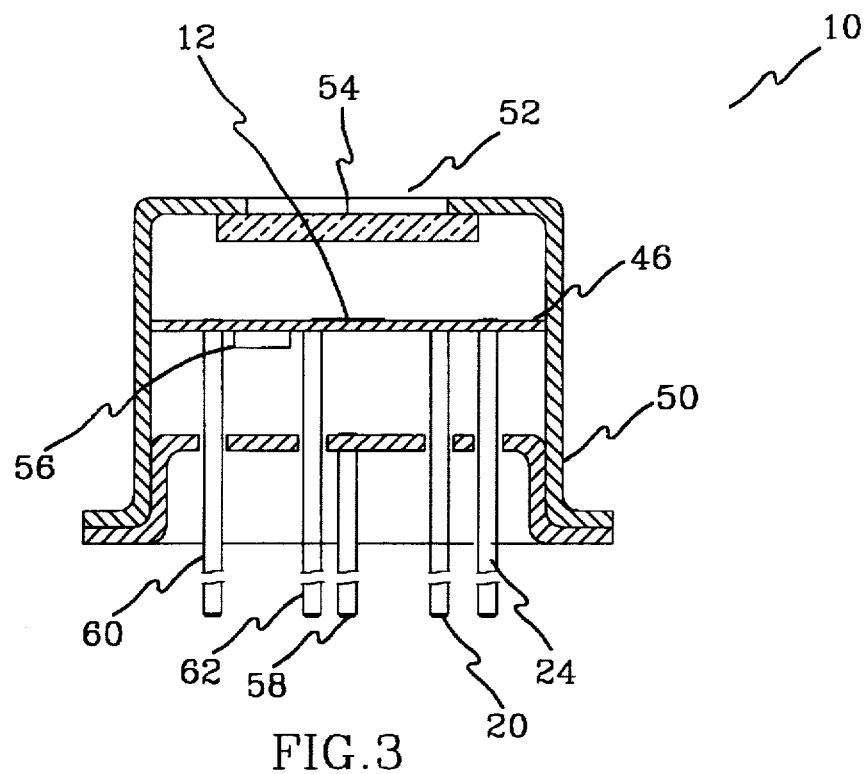
FIG. 3 is a sectional view of a thermopile detector of a preferred embodiment showing the mounting of the thermopile within a housing.

With reference now to FIG. 3, there is shown a preferred mounting of the thermopile 12 enclosed within a housing or casing 50, preferably a standard hermetically sealed TO-5 package. Within the housing 50, the thermopile 12 is mounted on the substrate 46 facing towards a window opening 52 formed in the housing 50 to permit radiation from the target 26 to pass onto the surface of the substrate 46. A piece of optical filter material 54 is mounted immediately adjacent to the window opening 52. The optical filter material 54 is preferably selected to define an infrared pass band of interest, e.g., 8–14 micrometers or 2.0–2.4 micrometers. In an alternative embodiment, the optical filter material 54 may alternately pass and block infrared radiation from the junctions to form active and blind thermocouples without requiring the described high and low emissivity coatings. A local temperature monitoring device 56, e.g., a diode, is mounted on the opposing side of the substrate 46. This local temperature monitoring device 56 is discussed further below. In addition to the conductive posts 20 and 24 which are coupled to the thermopile 12, a grounding post 58 is coupled to the housing 50.

The responsivity or sensitivity factor of a thermopile is dependent upon ambient temperature. Thus, the local temperature monitoring device 56 is preferably located in close proximity to the thermopile substrate 46. A thermistor, diode or other device may be used for this purpose. The local temperature monitoring device 56 is preferably mounted on the opposite side of the substrate 46 from the thermopile 12. The diode or other temperature monitoring device 56 is connected to conductive posts 60 and 62.

Figure 4:
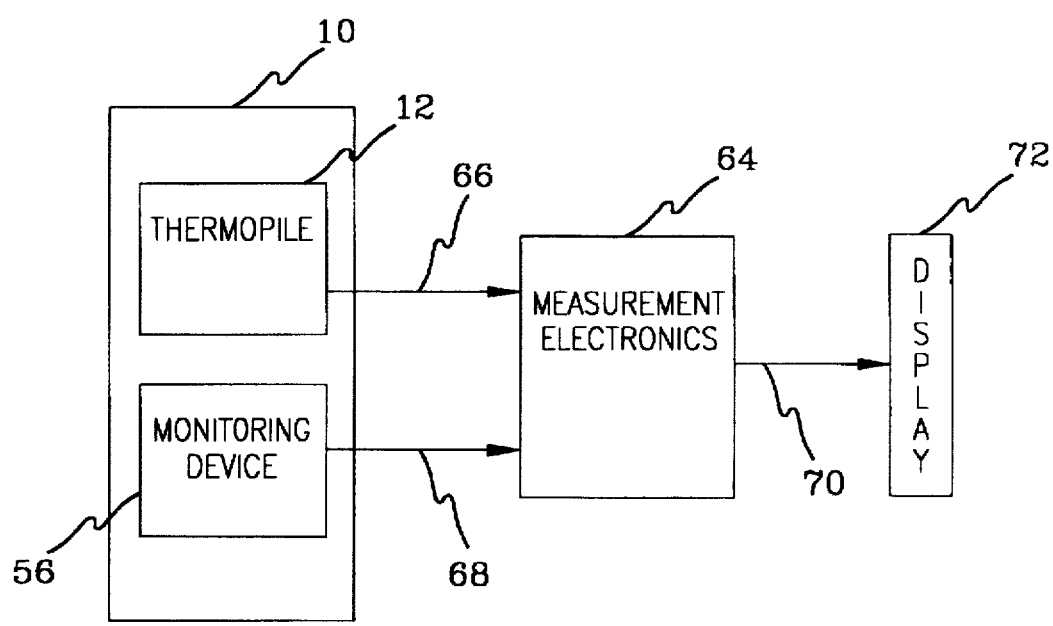
FIG. 4 is a block diagram of a preferred thermopile detector having a compensating local temperature monitoring device, both interfaced to measurement electronics.

With reference now to FIG. 4, there is shown a block diagram of the preferred thermopile detector 10, comprised of the thermopile 12 and the compensating temperature monitoring device 56, coupled to measurement electronics 64 as disclosed in U.S. Pat. No. 4,722,612 issued to K. G. Junkert and H. P. Vosnick, which is incorporated herein by reference. The local temperature measuring device 56 corresponds to diode 174 shown in U.S. Pat. No. 4,722,612 and functions to compensate for ambient temperature changes. The configuration of the thermopile 12 in accordance with the present invention further minimizes errors attributable to ambient temperature changes which cause temperature gradients and/or transients. The measurement electronics 64 alternately measures a first voltage signal 66 representative of the temperature of the target 26 and adjusts this first voltage signal with a second voltage signal 68 from the compensating temperature monitoring device 56 to correct for the ambient temperature. A compensated voltage signal 70 is used to drive a display 72 that indicates the temperature of the target 26.

Although the present invention has been described in detail with reference only to the presently-preferred embodiments, those of ordinary skill in the art will appreciate that various modifications can be made without departing from the invention. Accordingly, the invention is defined by the following claims.

I claim:

1. A detector for responding to infrared radiation from a target to produce a temperature indicating output signal to measurement electronics, said detector comprising:
   a plurality of first thermocouples each having a junction for producing an output voltage having a first component related to the amount of infrared radiation incident thereon and a second component related to ambient temperature;
   a plurality of second thermocouples each having a junction for producing a compensating voltage related to ambient temperature essentially identical to said second component produced by said first thermocouples;
   said first thermocouple junctions and second thermocouple junctions supported on a common surface in close proximity to one another physically interleaved along an essentially circular path having a radius of less than 0.5 mm; and
   summing means electrically interconnecting said first thermocouple junctions and said second thermocouple junctions in electrical opposition to produce an output voltage related to the amount of infrared radiation incident on said first thermocouple junctions.

2. The detector as in claim 1, wherein each of said first thermocouple junctions is comprised of first and second dissimilar conductive materials; and
   a high emissivity material coating each of said first junctions.

3. The detector as in claim 2, wherein each of said second thermocouple junctions is comprised of said first and second dissimilar conductive materials; and
   a low emissivity material coating each of said second junctions.

4. The detector as in claim 3, wherein said summing means comprises electrically connecting said first thermocouple junctions and said second thermocouple junctions in series.

5. The detector as in claim 3, wherein said low emissivity material is selected from the group of gold, silver and aluminum.

6. The detector as in claim 3, wherein said high emissivity material comprises carbon black.

7. The detector as in claim 3, further including:
   a plurality of interconnection posts couples to the measurement electronics; and
   thermally isolated interconnection means to electrically couple said voltage related to the amount of incident infrared ration to said connection posts.

8. A detector useful in an infrared thermometer comprising;
   a plurality of first junctions of dissimilar conductors for generating a first voltage component in response to incident infrared radiation from a target and a second voltage component in response to ambient temperature;
   a plurality of second junctions of dissimilar conductors identical to said dissimilar conductors forming said first junctions for generating a third voltage in response to ambient temperature wherein said third voltage is essentially equivalent to said second voltage but of opposite polarity;
   a thermally conductive substrate having said first junctions and said second junctions supported on a common surface of said substrate physically interleaved along an essentially circular path having a radius of less than 0.5 mm; and
   summing means to sum the voltages produced by said plurality of first junctions and said plurality of second junctions to produce a voltage related to the amount of incident infrared radiation essentially independent of ambient temperature transients.

9. A detector as in claim 8 wherein said first junctions are coated with a high emissivity material.

10. A detector as in claim 9 wherein said second junctions are coated with a low emissivity material.

11. A detector as in claim 10 wherein said summing means comprises electrically connecting said first junctions and said second junctions in series.

12. A detector as in claim 11 wherein said low emissivity material is selected from the group of gold, silver and aluminum.

13. A detector as in claim 11 wherein said high emissivity material comprises carbon black.

14. A detector as in claim 11 further including interconnection posts; and
   conductive material laid down in serpentine fashion for connecting said voltage related to the amount of incident infrared radiation to said interconnection posts.

* * * * *